US007324356B2

(12) United States Patent
Johnston

(10) Patent No.: US 7,324,356 B2
(45) Date of Patent: Jan. 29, 2008

(54) COMMON-MODE CURRENT CANCELLATION WITH DIGITAL PULSES FOR ISOLATED APPLICATIONS

(75) Inventor: Lee H. Johnston, Austin, TX (US)

(73) Assignee: National Instruments Corporation, Austin, TX (US)

( * ) Notice: Subject to any disclaimer, the term of this patent is extended or adjusted under 35 U.S.C. 154(b) by 270 days.

(21) Appl. No.: 11/255,705

(22) Filed: Oct. 21, 2005

(65) Prior Publication Data

US 2007/0091648 A1 Apr. 26, 2007

(51) Int. Cl.
*H02J 1/02* (2006.01)
*H02M 3/18* (2006.01)
*H02M 3/335* (2006.01)

(52) U.S. Cl. ...................................... 363/39; 363/56.06
(58) Field of Classification Search ............ 363/22–25, 363/39–41, 50, 55, 56.01, 56.06, 56.07
See application file for complete search history.

(56) References Cited

U.S. PATENT DOCUMENTS

| 4,585,987 | A |   | 4/1986  | Prue, Jr. et al. |
|-----------|---|---|---------|------------------|
| 4,891,742 | A | * | 1/1990  | Pradat ........................ 363/39 |
| 5,353,212 | A |   | 10/1994 | Loftus, Jr. |
| 5,414,348 | A |   | 5/1995  | Niemann |
| 5,587,692 | A |   | 12/1996 | Graham et al. |
| 5,606,250 | A |   | 2/1997  | Niemann |
| 6,084,791 | A | * | 7/2000  | Gopfrich ..................... 363/98 |
| 6,320,765 | B2 | * | 11/2001 | Yasumura ................ 363/21.02 |
| 6,437,999 | B1 |   | 8/2002  | Wittenbreder |
| 6,507,176 | B2 |   | 1/2003  | Wittenbreder, Jr. |
| 2003/0128558 | A1 | * | 7/2003  | Takahashi et al. ............ 363/39 |

* cited by examiner

*Primary Examiner*—Matthew V. Nguyen
(74) *Attorney, Agent, or Firm*—Meyertons Hood Kivlin Kowert & Goetzel, P.C.; Jeffrey C. Hood; Mario J. Lewin

(57) ABSTRACT

A mechanism for reducing common-mode current in a system including a first subsystem and an isolated subsystem. The isolated subsystem may receive the common-mode current from the first subsystem via an isolation mechanism. The isolation mechanism (e.g., a transformer) may isolate the isolated subsystem from the first subsystem by blocking DC signals. The first subsystem may include a pulse generation unit and compensation circuitry. The pulse generation unit may provide a first pulse and a second pulse to the compensation circuitry. The phase and duty cycle of the pulses may be varied based on measured characteristics of the isolation mechanism. The compensation circuitry may generate a cancellation signal based on the first and second pulses. Furthermore, the compensation circuitry may provide the cancellation signal to a ground plane of the isolated subsystem to reduce the common-mode current received at the isolation subsystem.

20 Claims, 4 Drawing Sheets

COMMON-MODE CURRENT CANCELLATION WITH DIGITAL PULSES FOR ISOLATED APPLICATIONS

BACKGROUND OF THE INVENTION

1. Field of the Invention

This invention relates to noise cancellation techniques and, more particularly, to common-mode current cancellation techniques for isolated applications.

2. Description of the Related Art

A push-pull DC-DC converter may be used to generate isolated power supplies in a system including a non-isolated subsystem and an isolated subsystem. The transformer of the DC-DC converter may provide the power necessary for operation of the circuitry in the isolation subsystem. In addition, the transformer may provide isolation between the non-isolated subsystem and the isolated subsystem by blocking DC signals.

A typical problem with systems implementing isolation applications is the common-mode current that flows from the non-isolated primary to the isolated secondary through the parasitic capacitance inside the transformer. The common-mode current may interfere with the signals in the I/O channel of the isolated subsystem and may potentially cause interference in a customer's circuit or system that is connected to the isolated subsystem. One method to minimize the common-mode current is to place a grounded shield between the primary and secondary of the transformer. However, the grounded shield usually increases the transformer size, cost, and complexity.

Another technique to minimize the common-node current is to inject a compensation current of the opposite phase into the isolated ground by using a potentiometer and a resistor-capacitor (RC) network. This solution may apply a scaled version of the primary waveform to a capacitor connected to the isolated ground plane. The potentiometer may be used to weight one side of the primary more than the other. However, the potentiometer solution typically increases the parts count and cost of the system.

SUMMARY OF THE INVENTION

Various embodiments are disclosed of a mechanism for reducing common-mode current in a system including a first subsystem and an isolated subsystem. An isolation mechanism (e.g., a transformer) may isolate the isolated subsystem from the first subsystem by blocking DC signals. The isolated subsystem may receive a common-mode current from the first subsystem via the isolation mechanism.

In one embodiment, the first subsystem may include a pulse generation unit and compensation circuitry. The pulse generation unit may provide a first pulse and a second pulse to the compensation circuitry. The compensation circuitry may generate a cancellation signal based on the first and second pulses. Furthermore, the compensation circuitry may provide the cancellation signal to a ground plane of the isolated subsystem to reduce the common-mode current received at the isolation subsystem.

In one embodiment, the first and second pulses may be variable phase and duty cycle pulses. The phase and duty cycle of the first pulse and of the second pulse may be varied independently of one another and may be based on measured characteristics of the isolation mechanism. Also, the phase and duty cycle of the first pulse may be configurable relative to a first switching signal, and the phase and duty cycle of the second pulse may be configurable relative to a second switching signal. In addition, the first pulse and the second pulse may be inverted based on measured characteristics of the transformer.

Figure 1:
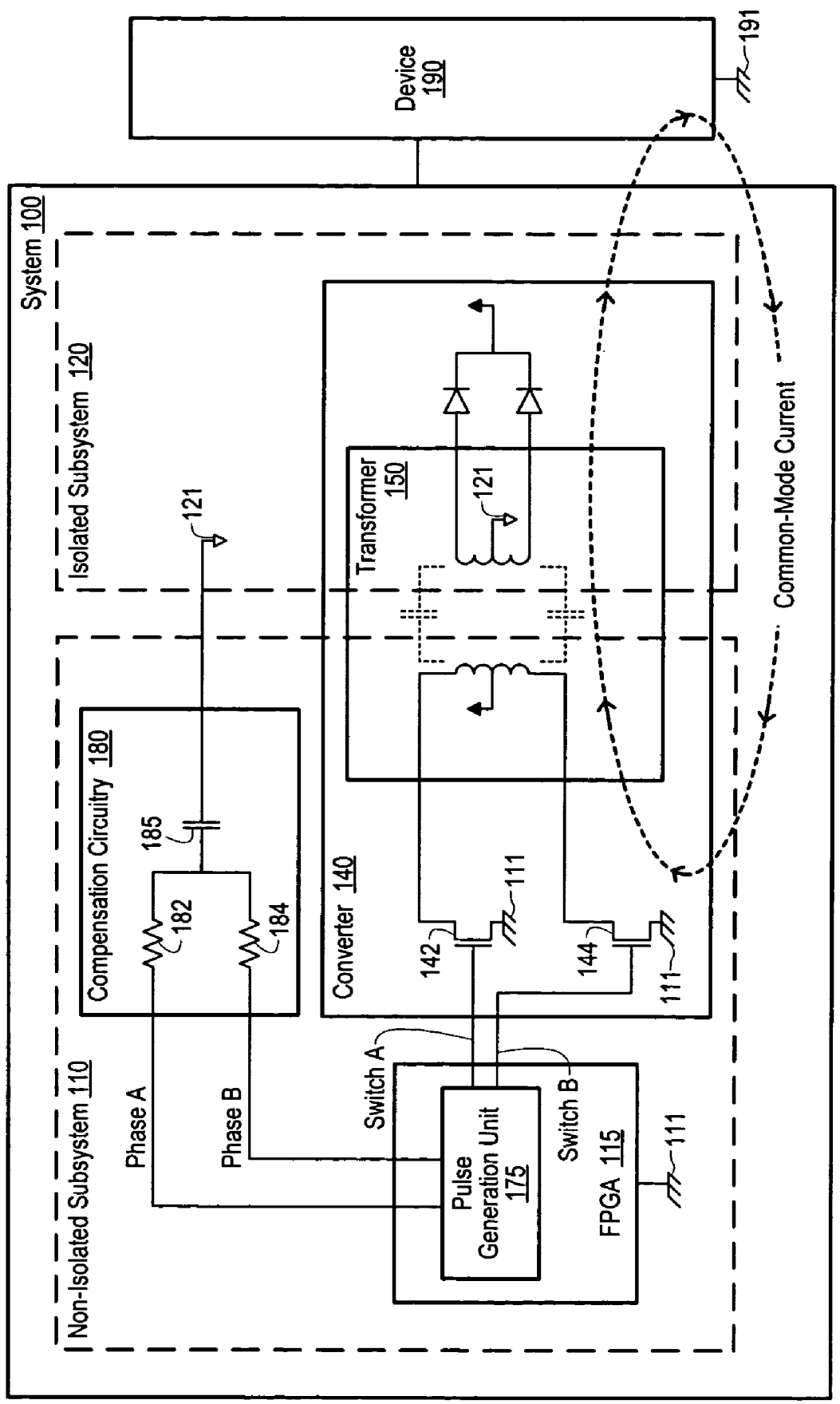
FIG. 1 is a diagram of one embodiment of a system including a mechanism for reducing common-mode current in an isolated subsystem.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

FIG. 1 is a diagram of one embodiment of a system 100 including a mechanism for reducing common-mode current in an isolated subsystem 120. As illustrated, the system 100 includes a non-isolated subsystem 110 and an isolated subsystem 120. During operation, a common-mode current may flow from non-isolated subsystem 110 to isolated subsystem 120. In one embodiment, circuitry within non-isolated subsystem 110 provides a first and a second pulse to a compensation circuit to generate a cancellation signal. The cancellation signal is injected into the isolated ground of the isolated subsystem 120 to reduce the common-mode current received at isolated subsystem 120.

System 100 may be a card or board plugged into one of the I/O slots of a computer system (see FIG. 5), or a card or board plugged into a chassis. System 100 may also be any of various types of computing or processing systems, including a personal computer system (PC), mainframe computer system, server system including a plurality of server blades, workstation, network appliance, Internet appliance, personal digital assistant (PDA), or other device or combinations of devices. It is noted however that system 100 may be other types of systems or devices including at least one isolated subsystem that receives a common-mode current, e.g., isolated subsystem 120.

The non-isolated subsystem may be formed as shown in the embodiment of FIG. 1. In the depicted embodiment of FIG. 1, the non-isolated subsystem 110 includes a field-programmable gate array (FPGA) 115, compensation circuitry 180, non-isolated ground 111, and a primary section of a converter 140. The primary section of converter 140 includes a primary side of a transformer 150 (i.e., an isolation mechanism), a switch 142 and a switch 144. Converter 140 may be a push-pull DC-DC converter. It is noted, however, that in some embodiments the non-isolated subsystem 110 may include other types of converters. Compensation circuitry 180 may be configured as an RC network. As illustrated in the embodiment of FIG. 1, compensation circuitry 180 is connected to converter 140 and includes a resistor 182, a resistor 184, and a capacitor 185. Also, FPGA 115 is connected to compensation circuitry 180 and converter 140 and includes a pulse generation unit 175. The pulse generation unit 175 may be implemented in hardware and/or software. Capacitor 185 may be a PCB capacitor. It is noted, however, that in various embodiments compensation circuitry 180 may include other types of capacitors. It is further noted that in other embodiments the non-isolated subsystem may include other types of compensation circuitry 180 that generates a cancellation signal based on the first and second pulses.

Furthermore, in the illustrated embodiment of FIG. 1, the isolated subsystem 120 includes a secondary section of converter 140, which includes a secondary side of transformer 150, and isolated ground 121. The isolated subsystem 120 may be connected to a device 190, e.g., an external unit under test (UUT). The transformer 150 may provide the power supplies necessary to power the isolated subsystem 120. The transformer 150 may also isolate the isolated subsystem 120 from the non-isolated subsystem 110 by blocking DC signals. It is noted, however, that in other embodiments the system 100 may include other types of isolation mechanisms that achieve isolation between the two subsystems by blocking DC signals.

It should be noted that the components described with reference to FIG. 1 are meant to be exemplary only, and are not intended to limit the invention to any specific set of components or configurations. For example, in various embodiments, one or more of the components described may be omitted, combined, modified, or additional components included, as desired.

During operation of system 100, a common-mode current may flow from non-isolated subsystem 110 to isolated subsystem 120 through the parasitic capacitance inside transformer 150. The common-mode current may interfere with the operation of the isolated subsystem 120 and/or the device 190. In one embodiment, pulse generation unit 175 of FPGA 115 provides a phase A and a phase B pulse to compensation circuitry 180 to generate a cancellation signal. The RC network of the compensation circuitry 180 may filter the waveforms to create the desired cancellation signal. The cancellation signal is then injected into the isolated ground 121 of the isolated subsystem 120 to reduce the common-mode current received at isolated subsystem 120. For example, the cancellation signal may cancel a relatively large portion of the received common-mode current.

Figure 2:
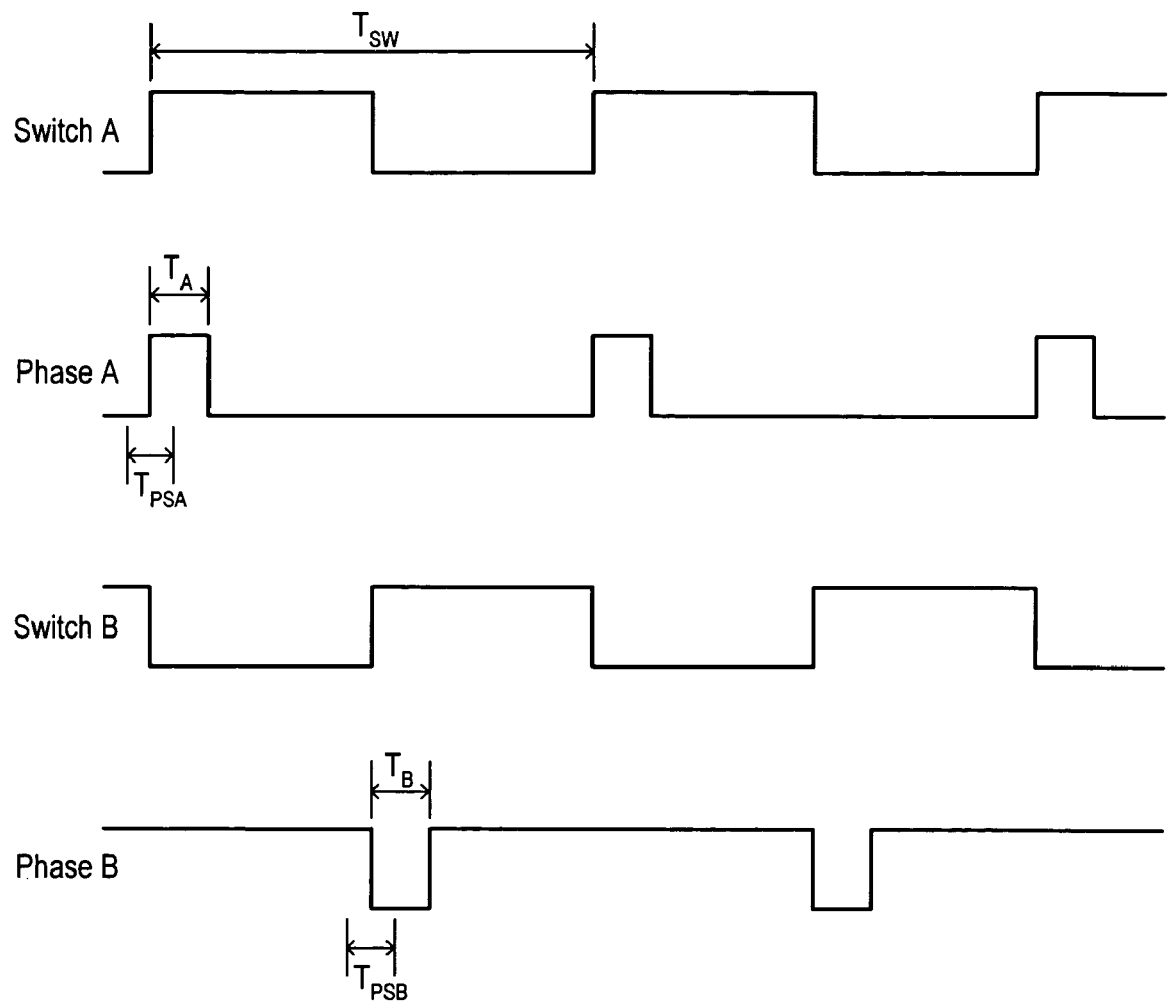
FIG. 2 is a timing diagram of the pulses generated by the pulse generation unit during the cancellation operation, according to one embodiment.

FIG. 2 is a timing diagram of the pulses generated by pulse generation unit 175 during the cancellation operation, according to one embodiment. Besides the phase A and B pulses, pulse generation unit 175 may also generate a switch A pulse and a switch B pulse. During operation of the transformer 150, the switch A pulse may control when switch 142 of converter 140 changes between on/off states, and the switch B pulse may control when switch 144 of converter 140 changes between on/off states. In one embodiment, these switching waveforms (switch A and B pulses) may be 50% duty cycle pulses, 180° out-of-phase, and have a period $T_{SW}$. It is noted, however, that in other embodiments the duty cycle and phase parameters associated with the switching waveforms may vary.

In one embodiment, the phase A and B pulses may be variable phase and duty cycle pulses. These compensation waveforms (phase A and B pulses) may be synchronous to the switching waveforms, and the phase and the duty cycle of each phase pulse may be configurable relative to the corresponding switch pulse. As illustrated in the embodiment of FIG. 2, the phase A pulse may have a variable period $T_A$ and a variable phase $T_{PSA}$ relative to the switch A pulse, and the phase B pulse may have a variable period $T_B$ and a variable phase $T_{PSA}$ relative to the switch B pulse. To achieve optimal cancellation results, the phase and duty cycle of the phase A pulse and of the phase B pulse may be varied independently of one another. In some embodiments, the phase A and phase B pulses may also be inverted as needed. For example, the phase A pulse shown in FIG. 2 may be inverted so that the falling edge of the phase A pulse may be synchronized with the rising edge of the switch A pulse. Since the pulse generation unit 175 of FPGA 115 may generate both the compensation waveforms and the switching waveforms, the waveforms may be on the same time base. It is noted, however, that in other embodiments the compensation and switching waveforms may be generated by different components of the system 100.

Figure 3A:
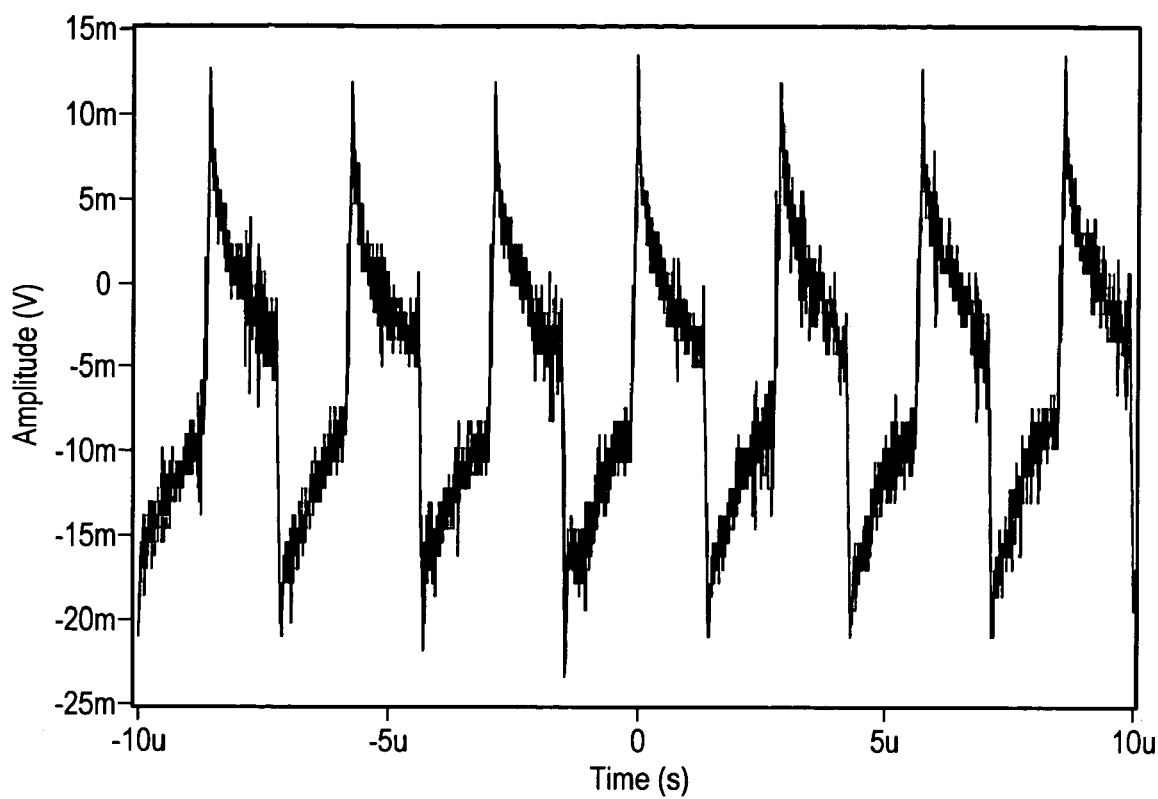
FIG. 3A is an example of an oscilloscope capture of an uncompensated common-mode current waveform received by the isolated subsystem, according to one embodiment.

Variable duty cycle pulses may be needed to account for both the capacitive imbalance in transformer 150 and the magnitude of the common-mode current received at the isolated subsystem 120. Transformers, even of the same make and model, may each have a unique amount and imbalance of parasitic capacitance due to the manufacturing process. Therefore, during manufacturing, each part may go through a calibration routine and other testing to determine certain characteristics of the transformer, e.g., the amount of imbalance of parasitic capacitance and the magnitude of the common-mode current. In one embodiment, during testing, the common-mode current may be measured by connecting a test resistor between the channel terminals of the isolated subsystem 120 and shorting the positive terminal to earth ground 191. This arrangement may force the common-mode current to flow through the test resistor. The voltage across the test resistor may then be measured with an oscilloscope to determine the common-mode current. FIG. 3A is an example of an oscilloscope capture of an uncompensated common-mode current waveform that may be received by isolated subsystem 120, according to one embodiment. It is noted, however, that in various embodiments the capacitive imbalance and the magnitude of the common-mode current may be measured by other methods.

Figure 3B:
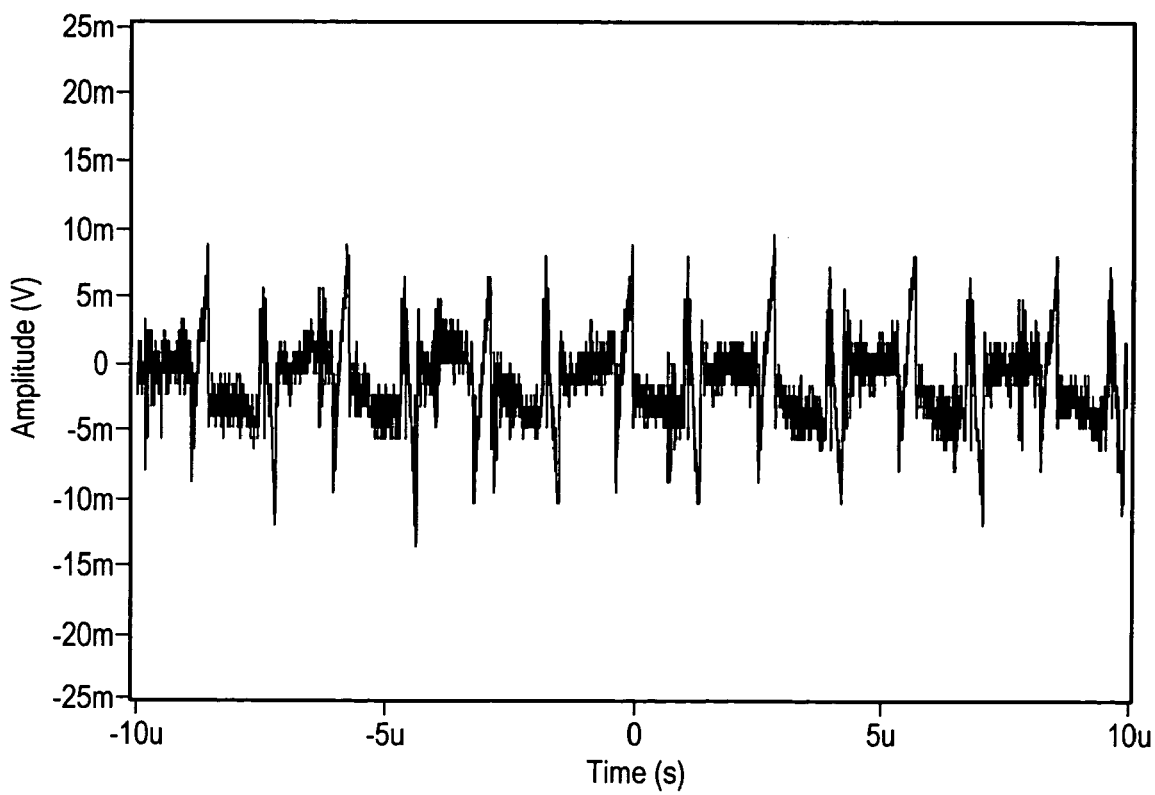
FIG. 3B is an example of an oscilloscope capture of a compensated common-mode current waveform received by isolation subsystem after the cancellation operation, according to one embodiment.

Based on the imbalance of parasitic capacitance and the magnitude of the common-mode current measured during testing, the duty cycle and phase of the phase A and B pulses may be varied to generate the necessary cancellation signal to reduce the common-mode current received at the isolated subsystem 120. Also, in some embodiments, the phase A pulse and/or the B pulse may be inverted based on the measured characteristics of transformer 150. FIG. 3B is an example of an oscilloscope capture of a compensated common-mode current waveform received by isolation subsystem 120 after the cancellation operation, according to one embodiment.

The duty cycle of the compensation pulses may be calculated using the equations show below.

phase A duty cycle, $$dc_A = \frac{T_A}{T_{SW}}$$

phase B duty cycle, $$dc_B = \frac{T_B}{T_{SW}}$$

The current through capacitor C1 may be a linear combination of the phase A and B pulses. If $V_A$ and $V_B$ are voltage sources that represent phase A and phase B, respectively, the transfer function for each phase may be represented by the equations shown below.

$$H_A(s) = \frac{\frac{R2}{s \cdot R2 \cdot C1 + 1}}{R1 + \frac{R2}{s \cdot R2 \cdot C1 + 1}}$$

$$H_B(s) = \frac{\frac{R1}{s \cdot R1 \cdot C1 + 1}}{R2 + \frac{R1}{s \cdot R1 \cdot C1 + 1}}$$

where R1 is resistor 182
R2 is resistor 184
C1 is capacitor 185

The voltage waveforms for phase A and B may be represented by their Fourier series since they are periodic.

$$V_A(t) = c_{A_0} + \sum_{n=1}^{\infty} [2 \cdot \text{Re}(c_{A_n}) \cdot \cos(n \cdot \omega_o \cdot t) - 2 \cdot \text{Im}(c_{A_n}) \cdot \sin(n \cdot \omega_o \cdot t)]$$

where $c_A$ are the Fourier series coefficients for phase A
$\omega_o$ is the frequency ($1/T_{SW}$)

$$c_{A_n} = \frac{1}{T_{SW}} \cdot \int_{-\frac{dc_A \cdot T_{SW}}{2}}^{\frac{dc_A \cdot T_{SW}}{2}} V_{CC} \cdot e^{-j \cdot n \cdot \omega_o \cdot t} \cdot dt \; n \in [0, \infty]$$

where $dc_A$ is the duty cycle of phase A
$V_{CC}$ is the FPGA 115 power supply $$c_{B_n} = \frac{1}{T_{SW}} \cdot \int_{-\frac{(1-dc_B) \cdot T_{SW}}{2}}^{\frac{(1-dc_B) \cdot T_{SW}}{2}} V_{CC} \cdot e^{-j \cdot n \cdot \omega_o \cdot t} \cdot dt \; n \in [0, \infty]$$

where $c_B$ are the Fourier series coefficients for phase B
$dc_B$ is the duty cycle of phase B Based on these calculations, the voltage across capacitor C1 may be derived as follows.

$$V_{C1}(t) = \sum_{n=-\infty}^{\infty} H_A(j \cdot n \cdot \omega_o) \cdot c_{A_n} \cdot e^{j n \omega_o t} + \sum_{n=-\infty}^{\infty} H_B(j \cdot n \cdot \omega_o) \cdot c_{B_n} \cdot e^{j n \omega_o t}$$

where $c_{A_n} = \overline{c_{A_n}}$ for $n < 0$

The current through C1 may then be calculated as shown below.

$$I_{C1}(t) = C1 \cdot \frac{dV_C(t)}{dt}$$

Then, the RMS value of this current may be computed as follows.

$$I_{rms} = \sqrt{\frac{1}{T_{SW}} \cdot \int_0^{T_{SW}} |I_{C1}(t)|^2 dt}$$

Figure 4:
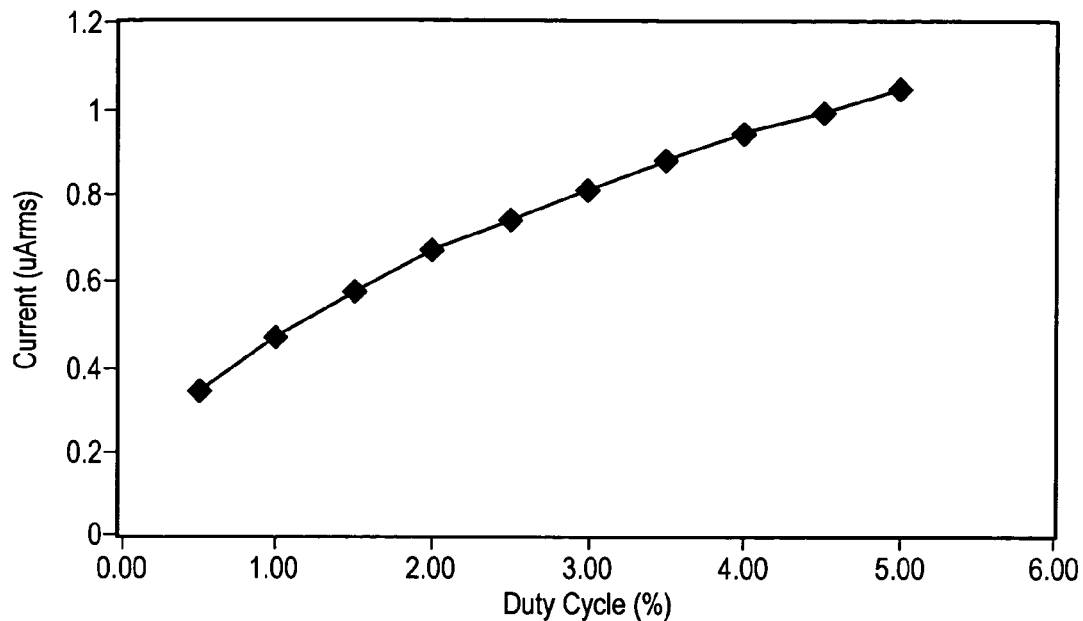
FIG. 4 is a graph showing the relationship between duty cycle and the current through the capacitor of the compensation circuitry, according to one embodiment.

As shown in the embodiment of FIG. 4, the magnitude of the current $I_{rms}$ may be a function of the duty cycles of the phase A and B pulses, according to one embodiment. As the duty cycle is increased, a larger cancellation current may be injected into isolated ground 121 to further reduce the common-mode current received at isolated subsystem 120. It is noted, however, that in other embodiments varying the duty cycle may affect the current differently than the relationship shown in FIG. 4.

Figure 5:
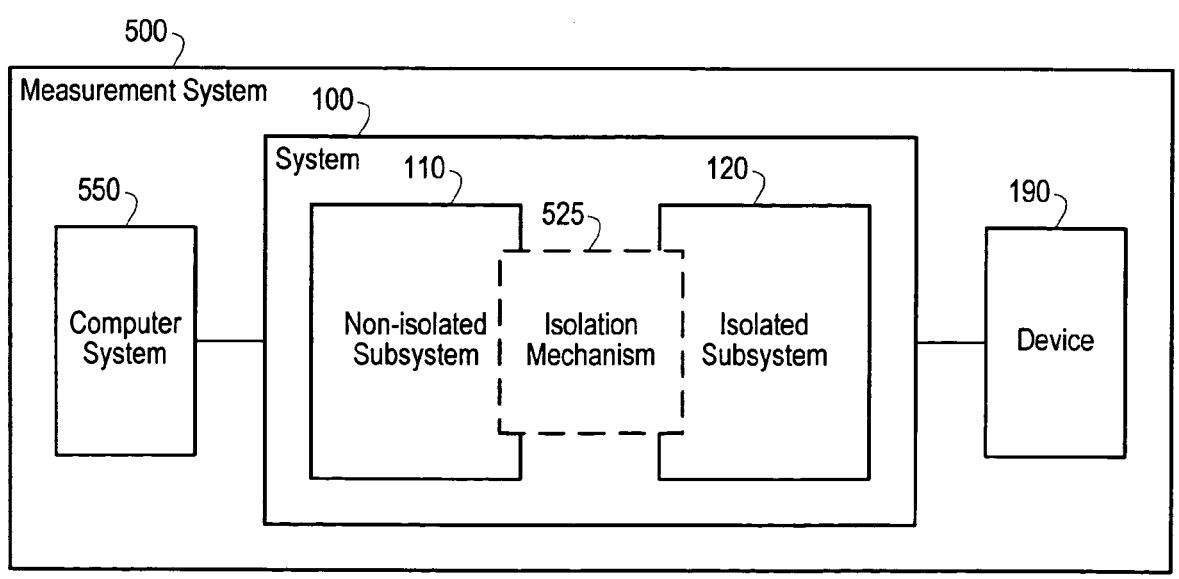
FIG. 5 is a block diagram of one embodiment of an instrumentation system including the system of FIG. 1.

FIG. 5 is a block diagram of one embodiment of an instrumentation system 500 including the system 100 of FIG. 1. In the depicted embodiment of FIG. 5, the instrumentation system 500 includes a computer system 550, system 100, and device 190. System 100 may be a card or board (e.g., an instrumentation device) configured to be plugged into one of the I/O slots of computer system 550. Non-isolated subsystem 110 may be the digital back-end of system 100, which may interface with computer system 550. Isolated subsystem 120 may be the system front-end including an analog input or an analog output channel, which may connect to a customer's device, e.g., device 190. Isolated subsystem 120 may include analog-to-digital converters, digital-to-analog converter, and/or conditioning circuitry to process the signals. Isolation mechanism 525 (e.g., transformer 150 of FIG. 1) may provide isolation between non-isolated subsystem 110 and isolated subsystem 120 by blocking DC signals. In some embodiment, isolation mechanism 525 may also provide the power necessary to operate isolated subsystem 120.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. A system comprising:
  a first subsystem configured to generate a cancellation signal, wherein the first subsystem includes:
    a pulse generation unit configured to generate a first pulse and a second pulse; and a compensation circuitry configured to receive the first and second pulses and generate a cancellation signal based on the first and second pulses; and an isolated subsystem coupled to the first subsystem via an isolation mechanism, wherein the isolation mechanism is configured to block DC signals from being received at the isolated subsystem, wherein the isolated subsystem is operable to receive a common-mode current from the first subsystem via the isolation mechanism;

wherein the compensation circuitry of the first subsystem is configured to provide the cancellation signal to a ground plane of the isolated subsystem to reduce the common-mode current received at the isolation subsystem.

2. The system of claim 1, wherein each of the first and second pulses is a variable phase and duty cycle pulse.

3. The system of claim 2, wherein the first subsystem further includes a first and a second switching mechanism coupled to the isolation mechanism, wherein the pulse generation unit is also configured to generate a first switching signal for changing a state of the first switching mechanism and a second switching signal for changing a state of the second switching mechanism.

4. The system of claim 3, wherein a phase and duty cycle of the first pulse is configurable relative to the first switching signal and a phase and duty cycle of the second pulse is configurable relative to the second switching signal.

5. The system of claim 4, wherein the phase and duty cycle of the first pulse and of the second pulse are varied independently of one another.

6. The system of claim 5, wherein the isolation mechanism is a transformer.

7. The system of claim 6, wherein the phase and duty cycle of the first pulse and of the second pulse are varied based on measured characteristics of the transformer.

8. The system of claim 7, wherein the first pulse and the second pulse are inverted based on measured characteristics of the transformer.

9. The system of claim 1, wherein the compensation circuitry is a resistor and capacitor (RC) network.

10. The system of claim 9, wherein the compensation circuitry includes a first resistor, a second resistor, and a first capacitor, wherein a first output terminal of the pulse generation unit is coupled to the first resistor and a second output terminal of the pulse generation unit is coupled to the second resistor, wherein a junction of the first and second resistors is coupled to the first capacitor, and wherein the first capacitor is coupled to the ground plane of the isolated subsystem.

11. A method for reducing common-mode current in a system including a first subsystem and an isolated subsystem, wherein the isolated subsystem is operable to receive a common-mode current from the first subsystem via an isolation mechanism, wherein the isolation mechanism is configured to isolate the isolated subsystem from the first subsystem by blocking DC signals, the method comprising:

generating a first pulse and a second pulse;

generating a cancellation signal based on the first and second pulses; and providing the cancellation signal to a ground plane of the isolated subsystem to reduce the common-mode current received at the isolation subsystem.

12. The method of claim 11, further comprising varying a phase and duty cycle of the first pulse and of the second pulse based on measured characteristics of the isolation mechanism.

13. The method of claim 12, further comprising inverting the first pulse and the second pulse based on measured characteristics of the isolation mechanism.

14. The method of claim 12, further comprising generating a first switching signal for changing a state of a first switching mechanism coupled to the isolation mechanism, and generating a second switching signal for changing a state of a second switching mechanism coupled to the isolation mechanism.

15. The method of claim 14, wherein said varying a phase and duty cycle of the first pulse and of the second pulse based on measured characteristics of the isolation mechanism includes varying a phase and duty cycle of the first pulse relative to the first switching signal and varying a phase and duty cycle of the second pulse relative to the second switching signal.

16. The method of claim 12, wherein said varying a phase and duty cycle of the first pulse and of the second pulse based on measured characteristics of the isolation mechanism includes varying the phase and duty cycle of the first pulse and of the second pulse independently of one another.

17. An instrumentation system comprising:

a computer system including one or more input/output (I/O) slots, each for receiving an instrumentation device; and a instrumentation device coupled to one of the I/O slots of the computer system, wherein the instrumentation device includes:

a first subsystem configured to generate a cancellation signal, wherein the first subsystem includes:

a pulse generation unit configured to generate a first pulse and a second pulse; and a compensation circuitry configured to receive the first and second pulses and generate a cancellation signal based on the first and second pulses; and an isolated subsystem coupled to the first subsystem via an isolation mechanism, wherein the isolation mechanism is configured to block DC signals from being received at the isolated subsystem, wherein the isolated subsystem is operable to receive a common-mode current from the first subsystem via the isolation mechanism;

wherein the compensation circuitry of the first subsystem is configured to provide the cancellation signal to a ground plane of the isolated subsystem to reduce the common-mode current received at the isolation subsystem.

18. The instrumentation system of claim 17, wherein the isolation mechanism is a transformer.

19. The instrumentation system of claim 18, wherein each of the first and second pulses is a variable phase and duty cycle pulse.

20. The instrumentation system of claim 18, wherein the phase and duty cycle of the first pulse and of the second pulse are varied based on measured characteristics of the transformer.

* * * * *